US012572842B2

(12) United States Patent
Zhu et al.

(10) Patent No.: US 12,572,842 B2
(45) Date of Patent: Mar. 10, 2026

(54) METHODS AND SYSTEMS FOR DECENTRALIZED FEDERATED LEARNING

(71) Applicant: HUAWEI CLOUD COMPUTING TECHNOLOGIES CO., LTD.

(72) Inventors: Rui Zhu, Montreal (CA); Xiaorui Li, Burnaby (CA); Yong Zhang, Markham (CA); Lanjun Wang, Markham (CA)

(73) Assignee: HUAWEI CLOUD COMPUTING TECHNOLOGIES CO., LTD., Gui'an New District (CN)

( * ) Notice: Subject to any disclaimer, the term of this patent is extended or adjusted under 35 U.S.C. 154(b) by 1008 days.

(21) Appl. No.: 17/067,547

(22) Filed: Oct. 9, 2020

(65) Prior Publication Data

US 2022/0114475 A1    Apr. 14, 2022

(51) Int. Cl.
*G06N 3/084* (2023.01)
*G06N 3/098* (2023.01)
*G06N 20/00* (2019.01)

(52) U.S. Cl.
CPC ............. *G06N 20/00* (2019.01); *G06N 3/098* (2023.01)

(58) Field of Classification Search
CPC .......... G06N 20/00; G06N 3/08; G06N 3/098; G06N 3/045; G06N 5/01; G06N 20/10; G06N 3/084; G16H 30/40; G16H 10/60; G16H 50/20; G16H 50/70
See application file for complete search history.

(56) References Cited

U.S. PATENT DOCUMENTS

| | | | | |
|---|---|---|---|---|
| 2012/0155275 A1* | 6/2012 | Massoulie | ............... | H04L 47/30 |
| | | | | 370/236 |
| 2017/0201410 A1* | 7/2017 | Allen | ....................... | G06F 15/16 |
| 2019/0227980 A1* | 7/2019 | McMahan | .............. | G06N 3/044 |
| 2019/0228025 A1 | 7/2019 | Chapman et al. | | |
| 2019/0228453 A1 | 7/2019 | Chapman et al. | | |

(Continued)

FOREIGN PATENT DOCUMENTS

| | | |
|---|---|---|
| CN | 110378749 | 10/2019 |
| CN | 111079977 | 4/2020 |
| CN | 111104731 | 5/2020 |

OTHER PUBLICATIONS

Hard et al., "Federated Learning for Mobile Keyboard Prediction", 2019, arXiv:1811.03604v2 (Year: 2019).*

(Continued)

*Primary Examiner* — Jeremy L Stanley
*Assistant Examiner* — Gary Mac

(57) ABSTRACT

Methods and systems for decentralized federated learning are described. Each client participating the training of a local machine learning model identifies one or more neighbor clients in direct communication with itself. Each client transmits to its neighbor clients a weighting coefficient and a set of local model parameters for the local model. Each client also receives from its neighbor clients respective sets of local model parameters and respective weighting coefficients. Each client updates its own set of local model parameters using a weighted aggregation of the received sets of local model parameters, each received set of local model parameters being weighted with the respective received weighting coefficient. Each client trains its local machine learning model using a machine learning algorithm and its own local dataset.

16 Claims, 7 Drawing Sheets

(56) References Cited

U.S. PATENT DOCUMENTS

| | | | | |
|---|---|---|---|---|
| 2019/0385043 | A1* | 12/2019 | Choudhary | ......... G06F 13/4213 |
| 2020/0050951 | A1* | 2/2020 | Wang | ..................... G06N 20/00 |
| 2020/0174433 | A1 | 6/2020 | Hughes et al. | |
| 2021/0097430 | A1* | 4/2021 | Das | ........................ G06N 20/00 |
| 2021/0142223 | A1* | 5/2021 | Choudhury | ........... G06F 16/901 |
| 2021/0357800 | A1* | 11/2021 | Sharma | .................. G06N 20/00 |
| 2021/0383280 | A1* | 12/2021 | Shaloudegi | ............. G06F 17/18 |
| 2023/0016595 | A1* | 1/2023 | Rydén | ............... H04W 36/0083 |

OTHER PUBLICATIONS

Zhang et al., "MDLdroid: a ChainSGD-reduce Approach to Mobile Deep Learning for Personal Mobile Sensing", 2020, arXiv: 2002. 02897 (Year: 2020).*

K. Bonawitz, H. Eichner, W. Grieskamp, D. Huba, A. Ingerman, V. Ivanov, C. Kiddon, J. Konecny, S. Mazzocchi, H. B. McMahan and others, "Towards Federated Learning at Scale: System Design," arXiv preprint arXiv:1902.01046, 2019.

International Search Report dated Jul. 8, 2021, PCT/CN/2021/ 075693.

Chenghao Hu et al:"Decentralized Federated Learning: A Segmented Gossip Approach",arXiv:1908.07782v1 [cs.LG] Aug. 21, 2019, total 7 pages.

* cited by examiner

10

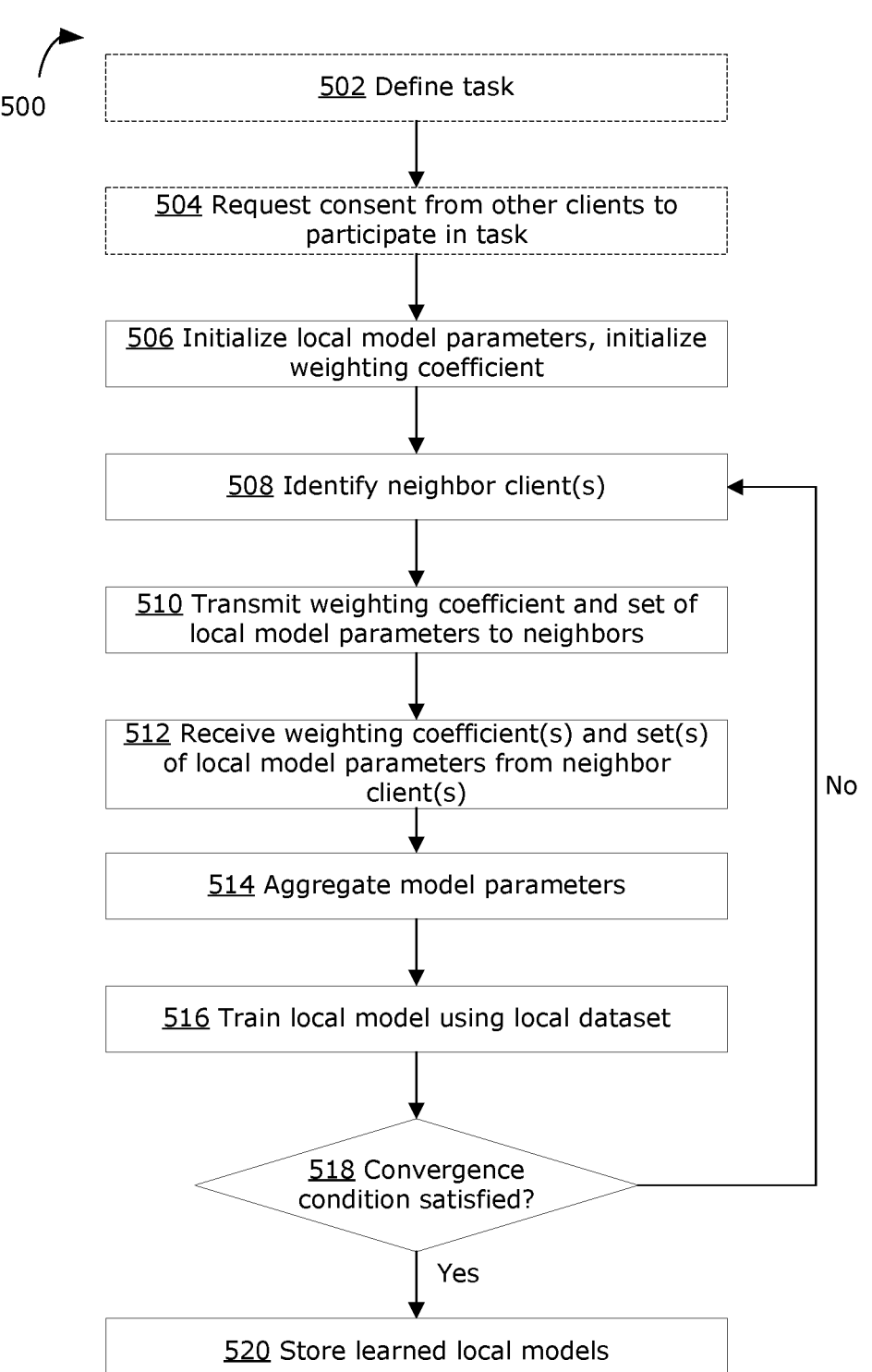

500

502 Define task

504 Request consent from other clients to participate in task

506 Initialize local model parameters, initialize weighting coefficient

508 Identify neighbor client(s)

510 Transmit weighting coefficient and set of local model parameters to neighbors 512 Receive weighting coefficient(s) and set(s) of local model parameters from neighbor client(s)

514 Aggregate model parameters

516 Train local model using local dataset

518 Convergence condition satisfied?

No

Yes

520 Store learned local models

702 Receive task initiation request

704 Request consent from other clients to participate in training task

706 Initialize local model parameters and transmit to all clients

708 Generate set of neighbor client(s) for each client

710 Convergence condition satisfied?

No

Yes

End

METHODS AND SYSTEMS FOR DECENTRALIZED FEDERATED LEARNING

FIELD

The present disclosure relates to methods and systems for training of machine learning-based models and deployment of trained machine learning models, in particular methods and systems for performing decentralized federated learning to learn a machine learning model related to a task using a machine learning algorithm.

BACKGROUND

The usefulness of artificial intelligence (AI) or machine-learning systems at least partly stems from the large number of machine learning models, the continuing development of computer system and architecture, and the large amount of data collected every day. A conventional machine learning process starts with collecting all necessary data and storing this data in a centralized datacenter or central server. Then, one or more machines (or a cluster of machines), either virtual, physical or both, are used for training a machine learning model related to a task in order to learn the parameters of the machine learning model. After the training is done, the trained machine learning model is deployed for inference (i.e. prediction) using new data.

However, this conventional machine learning process may have drawbacks or concerns. For example, the communication cost of transferring a large amount of data can be significant, especially when computing systems of end users (who are often the source of the collected data) have limited bandwidth. Further, centralizing data in a centralized datacenter or central server, where machine learning takes place, may be privacy-intrusive, and may risk a leak of an end user's private data. Moreover, the robustness of the machine learning system depends on the robustness of the centralized datacenter or central server (or cloud provider in some implementations). If the centralized datacenter or central server (or cloud provider) fails, the entire system abruptly fails without signs of gradual degradation of the training process.

It would be useful to provide a more robust machine learning system, in which data owners from multiple parties can participate in training AI models and at the same time retain data privacy.

SUMMARY

In various example embodiments, the present disclosure presents example methods and systems for implementing horizontal, decentralized federated learning, in which each client (or data owner) has at least some autonomy. Decentralized federated learning disclosed herein may, in some contexts, also be referred to as multi-party federated learning (MPFL).

In various example embodiments, the present disclosure describes methods and systems for horizontal, decentralized federated learning that enable each client to learn a local machine learning model related to a task using a machine learning algorithm and a local dataset, rather than learning a single central model for all clients during training. Each client participates in cooperative training of machine learning models, however the respective local model is optimized based on the local, private local dataset stored at each respective client.

In various example embodiments, the methods and systems of the present disclosure for horizontal, decentralized federated learning enable preservation of data privacy by each client during learning of a local model. No local data is shared by the client with the central server or other clients during training of the local model.

In the example horizontal, decentralized federated learning systems described herein, each client may be responsible for updating its respective local model, which may lead to a more balanced workload over the entire federated learning system. Each client may communicate directly with another client (rather than via a central server), which may reduce the number of connection hops and thus lead to lower latencies during data transmission. The decentralized nature of the disclosed federated learning systems may result in greater robustness of the overall federated learning system, because the failure of any single client (or node) in the federated learning system is not expected to result in abrupt failure of the entire federated learning system.

In some example aspects, the present disclosure describes a client computing system of a decentralized federated learning system. The client computing system includes: a memory storing a first set of local model parameters for a local machine learning model, and storing a first weighting coefficient representing a relative importance of a local dataset; and a processing device in communication with the memory. The processing device is configured to execute instructions to cause the client computing system to: identify one or more neighbor client computing systems of the decentralized federated learning system in direct communication with the client computing system; transmit the first weighting coefficient and the first set of local model parameters to each identified neighbor client computing system; receive, from one or more other neighbor client computing system, a respective second set of local model parameters and a respective second weighting coefficient, the one or more other neighbor client computing systems being different or same as the identified one or more neighbor client computing systems; update the first set of local model parameters using a weighted aggregation of the respective second set of local model parameters received from the one or more other neighbor client computing systems, each respective second set of local model parameters being weighted with the respective second weighting coefficient; and train the local machine learning model using a machine learning algorithm and the local dataset.

In any of the examples, the processing device may be configured to execute instructions to cause the client computing system to: updating the first weighting coefficient using a normalized aggregation of the respective second weighting coefficient received from the one or more other neighbor client computing devices.

In any of the examples, the processing device may be configured to execute instructions to cause the client computing system to: define a task to be learned by the local machine learning model, a definition of the task including a model architecture and a set of parameters to be used for the local machine learning model, the definition of the task also including a loss function to be used for training the local machine learning model; and transmit a task initialization request to one or more other client computing systems of the decentralized federated learning system.

In any of the examples, the task initialization request may be transmitted to a scheduler, and the task initialization request may cause the scheduler to transmit a participation request to each of one or more other client computing systems of the decentralized federated learning system.

In any of the examples, the processing device may be configured to execute instructions to cause the client computing system to: initialize each local model parameter of the first set of local model parameters to an initial model parameter value; and initialize the first weighting coefficient to an initial weighting coefficient value.

In any of the examples, the set of initial model parameter values may be received from another client computing system of the decentralized federated learning system.

In any of the examples, the initial weighting coefficient value may be based on a size of the local dataset (i.e. the number of elements in the local dataset).

In any of the examples, the processing device may be configured to execute instructions to cause the client computing system to: identify the one or more neighbor client computing systems using a list of the one or more neighbor client computing systems provided by a scheduler.

In any of the examples, the processing device may be configured to execute instructions to cause the client computing system to: identify only one neighbor computing systems in direct communication with the client computing system; transmit the first weighting coefficient and the first set of local model parameters to only the one identified neighbor client computing system; and receive, the second set of local model parameters and the second weighting coefficient from only one other neighbor client computing system that is different from the one identified neighbor client computing system. The weighted aggregation used to update the first set of local model parameters may be a linear combination of the first set of local model parameters and the second set of local model parameters.

In any of the examples, an iteration may be defined by: identifying the one or more neighbor client computing systems, transmitting the first weighting coefficient and the first set of local model parameters, receiving the respective second set of local model parameters and the respective second weighting coefficient, updating the first set of local model parameters, and training the local machine learning model. The processing device may be configured to execute instructions to further cause the client computing system to: repeat the iteration until a predefined convergence condition is satisfied.

In any of the examples, the one or more neighbors identified in a first iteration may be different from the one or more neighbor client computing systems identified in a second iteration.

In some example aspects, the present disclosure describes a computing system of a decentralized federated learning system. The computing system includes: a memory storing a first set of local model parameters for a local machine learning model, and storing a first weighting coefficient representing a relative importance of a local dataset; and a processing device in communication with the memory. The processing device is configured to execute instructions to cause the computing system to: receive a task initiation request, the task initiation request defining a task to be learned by a local machine learning model at each of a plurality of client computing systems of the decentralized federated learning system; initialize a set of initial model parameter values for a set of local model parameters to be used by the local machine learning model, and transmit the set of initial model parameter to each of the plurality of client computing systems; and generate, for each of the plurality of client computing systems, a respective set of one or more neighbor client computing systems for exchanging information during training to learn the local machine learning model, and transmit the respective set of one or more neighbor client computing systems to each respective client computing system.

In any of the examples, the processing device may be configured to execute instructions to cause the computing system to: receive, from each of the plurality of client computing systems, consent to participate in training to learn the task. The set of initial model parameters may be transmitted to each respective client computing system after receiving consent from the respective client computing system.

In any of the examples, a definition of the task included in the task initiation request may include a model architecture and a set of parameters to be used for the local machine learning model, the definition of the task may also include a loss function to be used for training the local machine learning model. The processing device may be configured to execute instructions to cause the computing system to: transmit the definition of the task to each of the plurality of client computing systems.

In any of the examples, the processing device may be configured to execute instructions to cause the computing system to: determine whether a predefined convergence condition is satisfied; and transmit a notification to each of the plurality of client computing systems to end training of the local machine learning model.

In any of the examples, the respective set of one or more neighbor client computing systems generated for each of the plurality of client computing systems may be generated to optimize traffic flow and resource management among the plurality of client computing systems.

In any of the examples, the computing system may be one of the plurality of client computing systems.

In some example aspects, the present disclosure describes a method, at a client computing system of a decentralized federated learning system. The method includes: identifying one or more neighbor client computing systems of the decentralized federated learning system in direct communication with the client computing system; transmitting a first weighting coefficient and a first set of local model parameters to each identified neighbor client computing system, the first weighting coefficient representing a relative importance of a local dataset, the first set of local model parameters being parameters for a local machine learning model; receiving, from one or more other neighbor client computing systems, a respective second set of local model parameters and a respective second weighting coefficient, the one or more other neighbor client computing systems being different or same as the identified one or more neighbor client computing systems; updating the first set of local model parameters using a weighted aggregation of the respective second set of local model parameters received from the one or more other neighbor client computing systems, each respective second set of local model parameters being weighted with the respective second weighting coefficient; and training the local machine learning model using a machine learning algorithm and the local dataset.

In any example embodiment, the method may include any of the steps performed by the computing systems described above.

In any example embodiment, the computer-readable medium may include instructions to cause the computing systems described above to perform any of the steps described above.

BRIEF DESCRIPTION OF THE DRAWINGS

Reference will now be made, by way of example, to the accompanying drawings which show example embodiments of the present application, and in which:

FIG. 5 is a flowchart of an example method for decentralized federated learning, in according with the present disclosure;

Similar reference numerals may have been used in different figures to denote similar components.

DESCRIPTION OF EXAMPLE EMBODIMENTS

In example embodiments disclosed herein, methods and systems for horizontal, decentralized federated learning is described. In some examples, the disclosed method and system horizontal, decentralized federated learning may be referred to as method and system for multi-party federated learning (MPFL). Each client may be different independent entities, and each client has only access to its respective local, private dataset. The present disclosure may enable implementation of a more secure and efficient horizontal, decentralized federated learning system, which helps to protect data privacy and keep diversity among different clients, and at the same time provides each client with some autonomy. In particular, diversity among clients may be enabled by allowing each client to learn its own local model based on its own local dataset. Autonomy of each client may be enabled by allowing each client to control use of its own computing resources (e.g., controlling and performing its own aggregation and updating operations).

Figure 1:
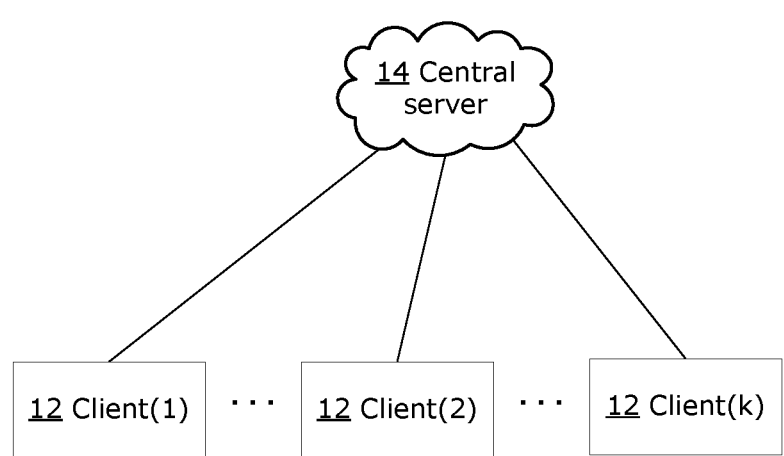
FIG. 1 is a block diagram of an example centralized computing system that may be used for machine learning.

To assist in understanding the present disclosure, FIG. 1 is first discussed.

FIG. 1 illustrates an example of a prior art centralized system 10, which may be used in the context of medical imaging. In this example, each client 12 is a respective hospital that wants to jointly train a central machine learning model for cervical image analysis. During training, the central machine learning model receives a cervical image as input, and outputs a prediction of whether the corresponding patient has cervical cancer. Each client 12 has a respective collection of cervical images with ground-truth labels (e.g., a ground-truth label may segment and identify which object in the cervical image is classified as a tumor). The cervical images at each client 12 typically are not permitted to be shared with any other entity, for example because sharing of medical information between hospitals is generally not permitted (or is severely restricted) by regulation. In this example, a trusted central server 14 (e.g., a central server of a health unit or bureau governing these hospitals) may be trusted to use the private data (in this example, the cervical images) from each client 12 to learn a central machine learning model for cervical image analysis. In order for the centralized system 10 to work, there must be a central authority with explicit trust that manages the central server

14. A trusted central authority may be a public health unit or government office, but this may introduce additional complexities, such as legal issues. For example, centralized approval of budgets may be required for this specific purpose, and maintenance of the centralized system 10 may be less efficient due to potentially involved legal procedures. Further, when the central server 14 is down or in maintenance, the whole centralized system 10 fails immediately.

A known approach to train a machine learning model related to a task from a large dataset is to split the dataset into several parts and build a distributed cluster of client computing systems (also referred to simply as clients) for training the machine learning model. Such an approach is referred to as distributed machine learning. A decentralized distributed machine learning (DDML) system is a system for distributed machine learning in which there is no central server, and instead clients are directly connected in a decentralized topology. Each client interacts only with its directly connected neighbor client. For the purpose of training a machine learning model related to a task, each client may share some data randomly sampled from its respective local dataset, and receive data randomly sampled from the local datasets of other clients. When training the machine learning model related to the task, such as a deep neural network model, instead of sharing data, each client may share a respective update to the machine learning model computed at the client (e.g., in the form of local gradients).

Figure 2:
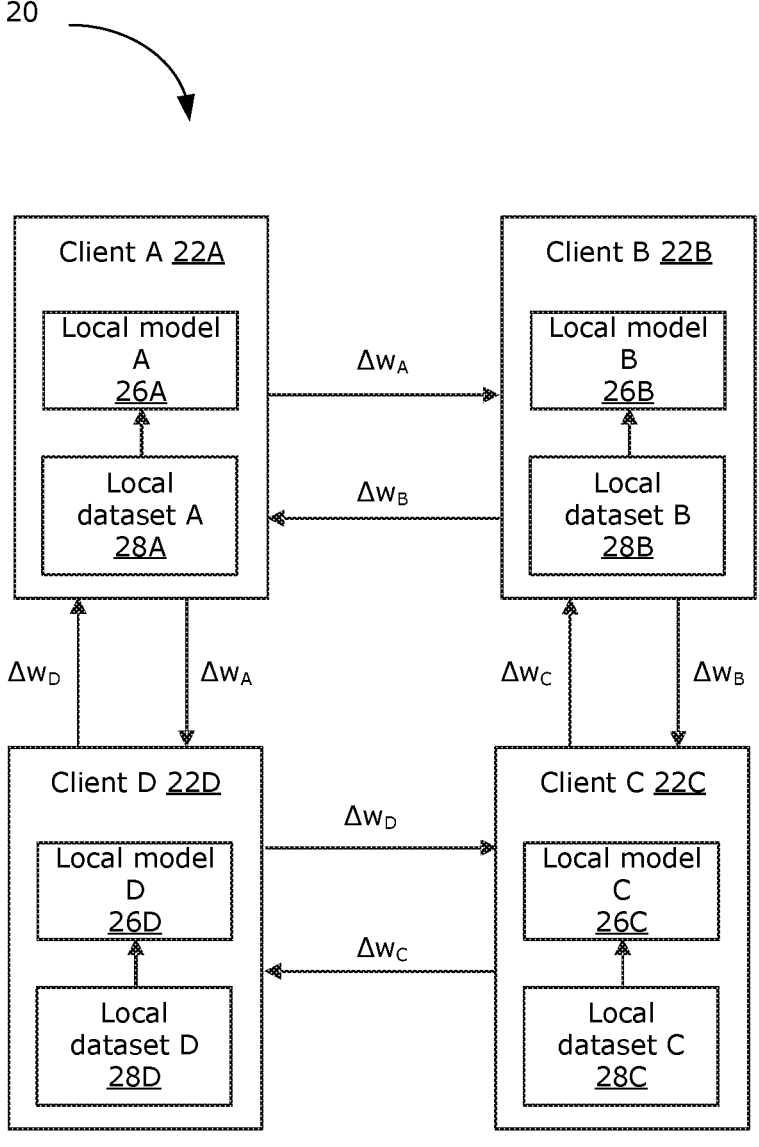
FIG. 2 is a block diagram of an example system for distributed machine learning.

FIG. 2 illustrates an example DDML system 20. The DDML system 20 is simplified for the purpose of illustration. In this example, the DDML system 20 has four clients, namely client A 22A, client B 22B, client C 22C and client D 22D (generally referred to as clients 22), which are connected in a ring topology. Each client 22 only interacts with its neighbor. A neighbor of a given client is defined as another client that has a direct connection with the given client. For example, client A 22A is directly connected to client B 22B and client D 22D, hence client B 22B and client D 22D are neighbors of client A 22A, but client C 22C is not a neighbor of client A 22A. Each client 22 stores a respective local dataset (local datasets A, B, C, D 28A, 28B, 28C, 28D, generally referred to as local dataset 28). Each client 22 also executes a machine learning algorithm to learn the parameters of a local machine learning model (local models A, B, C, D, 26A, 26B, 26C, 26D, generally referred to as local model 26) using the respective local dataset 28.

An example round of training in the DDML system 20 is now described. First, each given client 22 obtains data randomly sampled from its local data 28 (or a mini-batch of data randomly sampled from its local dataset 28), denoted as $\xi_i$ where the subscript i denotes the ith client 22. Each given client 22 executes a machine learning algorithm to perform forward propagation using the data randomly sampled from its local dataset 28 (or the mini-batch of data randomly sampled from its local dataset 28) to obtain a prediction for its local model 26, compute a loss for its local model 26 in accordance with a loss function, perform backpropagation to update its respective local model 26, and compute a gradient. The gradient may be represented as:

$$\Delta w_i = \frac{\partial f(w_i; \xi_i)}{\partial w_i}$$

where $w_i$ denotes the set of parameters (or weights) of the local model 26 at the ith client 22, and $f(w_i; \xi_i)$ is the local model 26 at the ith client 22.

Each client 22 shares its respective gradient with its neighbor clients 22, as indicated in FIG. 2, according to an AllReduce process. The AllReduce process is performed among the clients 22 to compute the mean of gradients of all clients 22. The result of the AllReduce process is that all clients 22 have a local model that is updated based on the mean of gradients from all clients 22. That is, the local model 26 at each client 22 is updated based on the mean of the gradients $\Delta w_A$, $\Delta w_B$, $\Delta w_C$ and $\Delta w_D$.

Drawbacks of existing DDML systems, such as DDML system 20, include loss of data privacy. For example, in some implementations of a DDML system, clients 22 share data randomly sampled from their private local datasets. Another drawback is that existing DDML systems, such as DDML system 20, typically require frequent exchange of model updates, which may consume a large amount of communication resources. Further, many existing DDML systems, such as DDML 20, rely on the assumption that data distributions across different local datasets are similar, at least with bounded dissimilarity. However, this assumption may not be realistic or valid in general (e.g., in implementations where a client 22 is an end user device), for example each mobile device generates data due to an end user's behavior, which can be quite different from another end user. In addition, the size of the local dataset (i.e., the number of elements in the local dataset) can vary (e.g., by orders of magnitude) across different clients 22. Another drawback of all existing DDML systems, such as DDML system 20, is that a single machine learning model is learned across all clients 22. All clients 22 end up with the same trained machine learning model, even though the characteristics (e.g., data distribution, dataset size) of the local datasets can be very different. The trained machine learning model is not optimized for each individual client 22.

Federated learning is a machine learning technique, in which clients participate in learning a machine learning model related to a task in a collaborative manner without sharing their local training datasets with each other. Horizontal federated learning may make use of non-IID local datasets that contain horizontally partitioned data. Non-IID (where IID stands for "independent and identically distributed") means that the local datasets may have non-identical data distributions. Horizontally partitioned data means that different local datasets contain different data that cover the same set of features.

Federated learning may help to address some drawbacks of DDML systems, such as DDML system 20 related to communication cost, statistical heterogeneity, and privacy concerns. In federated learning, data sampled from a local dataset is not shared by a client. Instead, clients only exchange information about the parameter (e.g. weights) of their local models.

In a centralized implementation of federated learning, also referred to as single-party federated learning (SPFL), a plurality of clients is connected to a central node. The central node may refer to a group of actual computational nodes (e.g., physical machines, virtual machines, processes, etc.) working together as to appear as a single node. The responsibilities of the central node include coordinating communications with clients, aggregating updates to local models received from clients, model management, among others. Each client has a respective private, local dataset that is used for training a respective local model. At any time, each client has only access to its own local dataset and cannot share data contained in its local dataset with any other client, including the central server. In an example round of training, the central node sends the latest learned parameters of the central model (referred to hereinafter as central model parameters) to each client (or a selected number of the clients). Each client updates the parameters of its respective local model (referred to hereafter as local model parameters) to match the central model parameters, then uses its local dataset (e.g., the entire local dataset, a mini-batches of data randomly sampled from its local dataset) to train its local model. During training of its local model, each client computes an update to its respective local model (i.e. an update to the parameters of its local model). Each respective client sends an update of its local model (i.e. local model update) to the central node. The central node aggregates local model updates received from the clients (e.g., computes an average of all received local model updates) and updates the central model based on the average of local model updates (i.e. updates the parameters of the central model based on an average of the updates of the parameters of each local model).

A SPFL system may address some drawbacks of existing DDML systems, such as DDML system 20. For example, demands on communication resources may be lower, and non-IID datasets across clients may be accommodated, while privacy of data at each client is maintained. A SPFL system enables training of a machine learning model using a large corpus of decentralized data. However, implementation of SPFL systems relies on a single trusted central node. Thus, SPFL systems may be suitable mainly for single-party use cases, where a single entity or authority is involved in governance of what type of data is shared among clients and how the data is shared among clients. However, SPFL systems may not be suitable when clients are associated with multiple different entities/authorities and a trusted centralized service provider is lacking.

SPFL systems also have some drawbacks due to their centralized design. For example, if the central node fails or connection to the central node fails, the entire SPFL system can fail. The failure of the entire SPFL system can be abrupt, without gradual degradation. Any system updates or maintenance to the central node may require downtime, and may need to be notified to all clients, leading to inefficiencies. Much of the workload in learning the central model is placed on the central node. Such an unbalanced workload may become a problem when there are many clients involved. SPFL systems may also suffer from higher latency. In an example round of training (i.e. training round), as described above, each participating client communicates with the central node at least twice, first to receive the parameters of the central model, then to send local model updates to the central node. If a client's connection to the central node has lower bandwidth, this may exacerbate the communication latency.

In various examples, the present disclosure describes a horizontal, decentralized federated learning system, also referred to as a multi-party federated learning (MPFL) system. In decentralized federated learning, there is no sharing of data of local datasets, and the privacy of the data of all clients is maintained. Clients cooperate to train local machine learning models, rather than training a single central machine learning model. That is, a respective local machine learning model related to a particular task is trained for each client, which is optimized based on the respective local dataset. In a horizontal, decentralized federated learning system, clients connect directly with other neighboring clients, which may help to reduce the number of connection hops and thus help to lower latency in data transmissions between clients. The role of a central node is reduced, or the central node may be entirely omitted in some examples. By reducing or omitting the role of a central node, the horizontal, decentralized federated learning system of the present disclosure may become more robust, because the failure of a single client does not necessarily result in abrupt failure of the horizontal, decentralized federated learning system. In a horizontal decentralized federated learning system, each client performs aggregation of information from its neighbor clients and updates its respective local model. The result is that the workload may be more balanced across clients, rather than being heavily placed on a central node. In some example, each client may also be responsible for defining its local topology.

Figure 3:
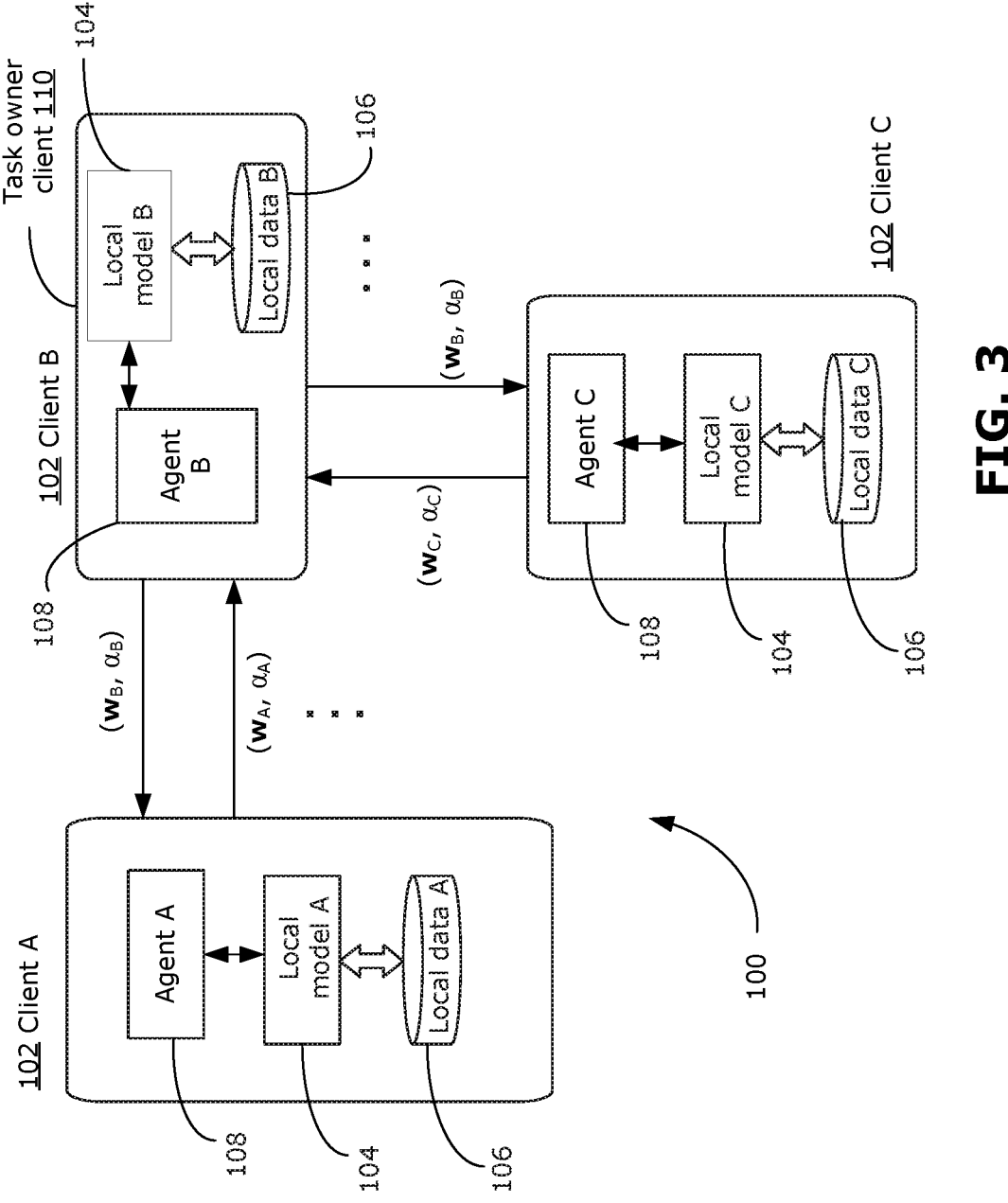
FIG. 3 is a block diagram illustrating an example implementation of a decentralized federated learning system, in accordance with the present disclosure.

FIG. 3 is a block diagram illustrating an example horizontal, decentralized federated learning system 100 (hereafter referred to as system 100) that may be used to implement examples of decentralized federated learning, as discussed herein. The system 100 has been simplified in this example for ease of understanding; generally, there may be more entities and components in the system 100 than that shown in FIG. 3. For the purpose of illustration, FIG. 3 shows a client B and its neighbors client A and client C (all generally referred to as a client 102). It should be understood that there may be greater or fewer numbers of neighbor clients directly connected to a given client 102, and each neighbor client may also have its own respective one or more other neighbor clients. A topology is formed by the direction connections among clients 102. The topology formed by the connections among clients may be any topology (e.g., ring topology, mesh topology, etc.).

The system 100 includes a plurality of clients 102, each of which collect and store respective sets of local data (referred to as local datasets) 106. Each client 102 can run a supervised machine learning algorithm to learn the parameters of a local model 104 using the local dataset. For example, each client 102 can run a supervised machine learning algorithm to learn the weights of a neural network that approximates the local model 104. The local model 104 of each client 102 are all related to the same task. For the purposes of the present disclosure, running a supervised machine learning algorithm at a client 102 means executing computer-readable instructions of a supervised machine learning algorithm to learn parameters of a local model. For generality, there may be n clients 102 (n being any integer larger than 1) and hence n local datasets 106. The local datasets 106 may be non-IID datasets, meaning the local datasets 106 are unique and distinct from each other, and it may not be possible to infer (i.e. predict) the characteristics or distribution of any one local dataset based on any other local dataset.

For simplicity, each client 102 is shown as having similar configuration. However, it should be understood that different clients 102 may have different configurations. For example, one client 102 may store multiple different local models and/or may have access to multiple different local datasets. In some example embodiments, the local model 104 and local dataset 106 may be stored by a respective client 102 within data storage may include one or more a physical machines, virtual machines (e.g., in the case where the client 102 is a private network) or containers. As previously mentioned, each client 102 may have different configurations independent from each other, and some clients 102 may include a container while other clients 102 may not.

Each client 102 may independently be an end user device, a network device, a private network, or other singular or plural entity that holds private local data. In the case where a client 102 is an end user device, the client 102 may be or may include such devices as a client device/terminal, user equipment/device (UE), wireless transmit/receive unit (WTRU), mobile station, fixed or mobile subscriber unit, cellular telephone, station (STA), personal digital assistant (PDA), smartphone, laptop, computer, tablet, wireless sensor, wearable device, smart device, machine type communications device, smart (or connected) vehicles, or consumer electronics device, among other possibilities. In the case where a client 102 is a network device, the client 102 may be or may include a base station (BS) (erg eNodeB or gNodeB), router, access point (AP), personal basic service set (PBSS) coordinate point (PCP), among other possibilities. In the case where a client 102 is a private network, the client 102 may be or may include a private network of an institute (e.g., a hospital or financial institute), a retailer or retail platform, a company's intranet, etc.

In the case where a client 102 is an end user device, the local data stored at the client 102 may be data that is collected or generated in the course of real-life use by user(s) of the client 102 (e.g., captured images/videos, captured sensor data, captured tracking data, etc.). In the case where a client 102 is a network device, the local data at the client 102 may be data that is collected from end user devices that are associated with or served by the network device. For example, a client 102 that is a BS may collect data from a plurality of user devices (e.g., tracking data, network usage data, traffic data, etc.) and this may be stored as local data on the BS.

Regardless of the form of the client 102, the data collected and stored at each client 102 as a local dataset is considered to be private (e.g., restricted to be used only within a private network if the client 102 is a private network), and it is generally desirable to ensure privacy and security of the local dataset at each client 102. The local model 104 of each client 102 may have full access to the respective local dataset 106 of each client 102.

For horizontal federated learning, the local datasets stored by the respective clients 102 are horizontally partitioned. That is, each of the k local datasets contains different data that represent the same set of features. The data contained in different local datasets may or may not overlap with each other, and the distributions of the local datasets are non-IID. It should be noted that the clients 102 may also store local datasets that are not horizontally partitioned, however a local dataset that is not horizontally partitioned across multiple clients 102 may not be considered in horizontal federated learning.

Each client 102 is directly connected to one or more neighboring clients 102, for example over peer-to-peer connections. The list of neighboring clients 102 (or simply neighbor clients) that are connected to a given client 102 may be referred to as the local topology of the given client 102.

Each client 102 may also implement a respective agent 108 (which may be a software component, a hardware component, or a combination of software and hardware). The agent 108 at each given client 102 manages the communication of information (including local model parameters and weight coefficients as discussed further below) between the given client 102 and each neighbor client 102. In particular, the agent 108 may help to ensure that none of the respective local datasets 106 is transmitted out from the respective client 102, or is accessed by any entity outside of the client 102. The agent 108 at each client 102 may only be used during a training phase (i.e. during training), when each client 102 learns its respective local model 104 (i.e. learns the set of local model parameters of its respective local model 104). After the training phase is completed (e.g., after a convergence condition has been satisfied), the agent 108 may no longer be required, and there may not be any further communication between each client 102 and its neighbors. The agent 108 at each client 102 may not play any role, and may be omitted or inactive when the trained local model is used for prediction (e.g., during an inference phase).

Figure 4:
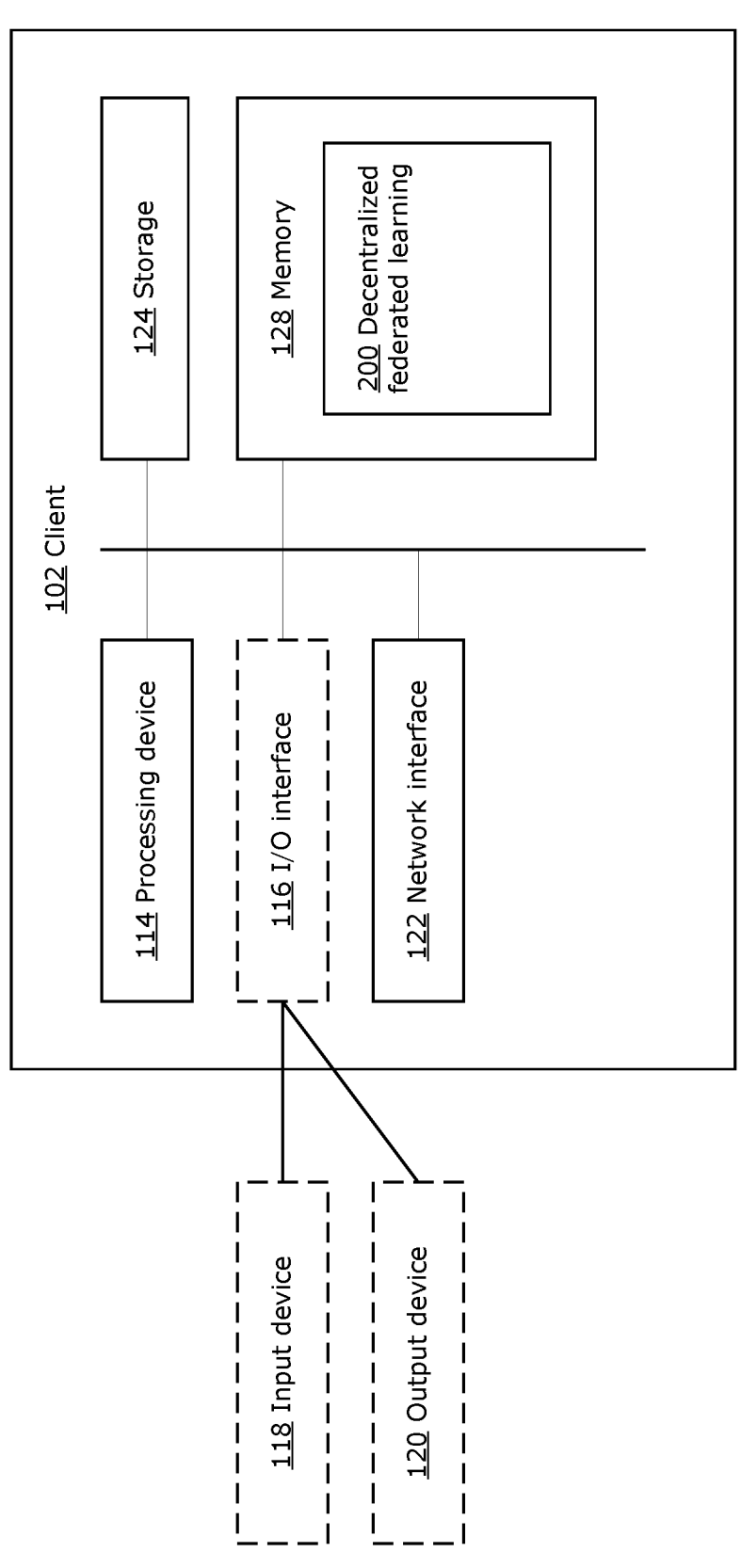
FIG. 4 is a block diagram illustrating an example computing system that may be used to implement a client in examples of the of the decentralized federated learning system of the present disclosure.

FIG. 4 is a block diagram illustrating a simplified example implementation of a client 102 (e.g., in the example where the client 102 is a single computing system). Other examples suitable for implementing embodiments described in the present disclosure may be used, which may include components different from those discussed below, and may include implementations where a client 102 is a group of virtual machines, physical machines, or both. Although FIG. 4 shows a single instance of each component, there may be multiple instances of each component in the client 102.

The client 102 (e.g., embodied as a single physical or virtual machine) may include one or more processing devices 114, such as a processor, a microprocessor, a digital signal processor, an application-specific integrated circuit (ASIC), a field-programmable gate array (FPGA), a dedicated logic circuitry, a dedicated artificial intelligence processor unit, a tensor processing unit, a neural processing unit, a hardware accelerator, or combinations thereof. The client 102 may also include one or more optional input/output (I/O) interfaces 116, which may enable interfacing with one or more optional input devices 118 and/or optional output devices 120.

In the example shown, the input device(s) 118 (e.g., a keyboard, a mouse, a microphone, a touchscreen, and/or a keypad) and output device(s) 120 (e.g., a display, a speaker and/or a printer) are shown as optional and external to the server. In other example embodiments, there may not be any input device(s) 118 and output device(s) 120, in which case the I/O interface(s) 116 may not be needed.

The client 102 may include one or more network interfaces 122 for wired or wireless communication with the network, the nodes 102, or other entity in the system 100. The network interface(s) 122 may include wired links (e.g., Ethernet cable) and/or wireless links (e.g., one or more antennas) for intra-network and/or inter-network communications.

The client 102 may also include one or more storage units 124, which may include a mass storage unit such as a solid state drive, a hard disk drive, a magnetic disk drive and/or an optical disk drive.

The client 102 may include one or more memories 128, which may include a volatile or non-volatile memory (e.g., a flash memory, a random access memory (RAM), and/or a read-only memory (ROM)). The non-transitory memory(ies) 128 may store instructions for execution by the processing device(s) 114, such as to carry out example embodiments described in the present disclosure. The memory(ies) 128 may include other software instructions, such as for implementing an operating system and other applications/functions. In some example embodiments, the memory(ies) 128 may include software instructions for execution by the processing device 114 to implement a module for decentralized federated learning 200, as discussed further below. In some example embodiments, the server may additionally or alternatively execute instructions from an external memory (e.g., an external drive in wired or wireless communication with the server) or may be provided executable instructions by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

Reference is again made to FIG. 3. As previously mentioned, the local model 104 at each client 102 is related to the same task. The local model related to the task may be defined by one client 102, which may be referred to as the task owner client 110 (in FIG. 3, client B is the task owner client 110). The task owner client 110 defines all aspects related to the local model related to the task, including the local model architecture, the loss function to be used for training the machine learning model (i.e. the loss function used to compute the loss for updating the parameters of the machine learning model (i.e. the model parameters)), and the machine learning algorithm to be used to train the machine learning model. Any client 102 in the system may play the role of the task owner client 110, and different clients 102 may be the task owner client 110 for different tasks in the same system 100. If multiple machine learning models related to different tasks are learned concurrently, there may be multiple task owner clients 110 (for respective multiple different tasks) at the same time. For simplicity, training of a single machine learning model related a task will be discussed.

The task owner client 110 initiates the training of its local model related to a task and communicates with other clients 102 to invite other clients 102 to participate in the training its local model related to the task. For example, the task owner client 110 may send a task initiation request to other clients 102 to ask for their consent to participate in the training the local model related to the task. For example, the task owner client 110 may broadcast the task initiation request to other clients 102, the task owner client 110 may send the task initiation request to its immediate neighbor client(s) (i.e., client(s) 102 that are directly connected to the task owner client 110) and instruct the recipient(s) of the request to further propagate the task initiation request to other connected client(s) 102, or any other suitable communication technique. Consent from each client 102 may be communicated back to the task owner client 110 in a similar way, for example directly transmitted back to the task owner client 110 in a response to a broadcasted request, or transmitted back to the task owner client 110 via other intermediate connections. After the task owner client 110 receives consent from a sufficient number of other clients 102 (e.g., the task owner client 110 may define a minimum number of participating clients 102 required for the training a local model related to the task to proceed), the task owner client 110 may communicate the definition of the local model related to task (e.g., including the defined model parameters, defined model architecture, defined loss function, number of training rounds, etc.) to the participating clients 102. The training rounds may then begin.

Before further discussion, some notation is introduced. $f(w; \xi)$ denotes a machine learning model (i.e., a function) having a set of parameters (e.g. weights) denoted as w, and accepting an input feature representation or map (which may be random) denoted as tensor $\xi$. The private local dataset 106 at the ith client 102 is denoted as $D_i$. In examples where model aggregation makes use of weighted aggregation techniques (e.g., weighted average), $\alpha_i$ denotes a coefficient for weighting the contribution from the ith client 102 during model aggregation. It should be noted that, generally, subscripts will denote the client 102 and superscripts will denote iterations (or training rounds).

FIG. 3 illustrates the information (e.g., local model parameters, and weighting coefficients) that may be communicated between clients 102 in a training round. In this example, client j is the task owner client 110, however it should be understood that the information that is communicated in a training round is not dependent on whether a client 102 is a task owner or not. Further details will be discussed with reference to FIG. 5.

FIG. 5 is a flowchart illustrating an example method 500 that may be performed by a client 102, during training of the local models 104 related to a task (referred to as a training phase). Some steps of the method 500 is performed by the task owner client 110 only, as indicated below. The method 500 may be implemented by software instructions of the module for decentralized federated learning 200 (e.g., see FIG. 4) when executed by the processing device 114 of the client 102.

The training phase begins with initialization. Initialization may be defined as the start of training of local models 104 related to a task, and the start of all training rounds. Initialization in the example of FIG. 5 includes steps 502-506. Steps 502 and 504 may be performed only by the task owner client 110, and step 506 may be performed by all clients 102 (including the task owner client 110).

At 502, the task owner client 110 defines the local model 104 related to the task (which may be denoted as T). Defining the local model 104 related to the task T includes defining the model architecture and the set of parameters for the local model 104, and a loss function used for computing a loss that is used for updating the set of parameters of the local model 104.

At 504, the task owner client 110 transmits (e.g., via a broadcast message) a task initiation request to one or more other clients 102 to request consent from other client(s) 102 to participate in the training the local models 104 related to the task T. Step 504 may be repeated until a minimum number of required other clients 102 (which may be a defined minimum that has been defined as part of defining the task at step 502) has provided consent to the task owner client 110. Assuming a sufficient number of other client(s) 102 has provided consent to participate in the training local models 104 related to the task, the method 500 proceeds to step 506. For simplicity, the following discussion will refer to the client(s) 102 participating in learning a local model related to the task as simply the client(s) 102. A definition of the local model related to the task (e.g., including the architecture of the local model 104, and a loss function used for computing a loss for updating the set of parameters of the local model) may be included in the task initiation request transmitted at 504. Alternatively, a definition of the local model related to the task may be transmitted after a sufficient number of client(s) have consented to participate in the training of the local model related to the task, and may be transmitted only to the client(s) 102 that have provided consent to participate in training the local model related to the task.

At 506, the set of local model parameters $w_j$ and weighting coefficient $\alpha_j$ are initialized at each client 102. For example, the task owner client 110 may initialize a set of local model parameters by initially setting the value of each parameter to a respective random value. The set of initial model parameter values is transmitted (e.g., broadcast) to all other client(s) 102. Each other client 102, after receiving the set of initial model parameter values, initializes its respective local model 104 using the received set of initial model parameter values. That is, the result of initialization is that the local models 104 at all clients 102 (including the task owner client 110) all have the same values for the set of local model parameters.

All clients 102 (including the task owner client 110) also initializes its respective weighting coefficient $\alpha_j$. The weighting coefficient $\alpha_j$ may be initialized using a random value, may be initialized using the same values across all clients 102 (e.g., a value of 1), or may be initialized based on some assumed relative importance (e.g., initialized as the size of the local dataset 106). Other approaches may be used for initializing the weighting coefficient $\alpha_j$. For example, the initial weighting coefficient $\alpha_j$ may be based on some predetermined relative trustworthiness of each client 102 (e.g., institutional clients 102 may have higher trustworthiness than end user clients 102, and hence may have a higher initial weighting coefficient $\alpha_j$). In another example, the initial weighting coefficient $\alpha_j$ may be based on similarity of data distribution of the local dataset 106 compared to that of the task owner 110.

The following steps 508-520 may be similar for all clients 102, including the task owner client 110, unless otherwise noted. For simplicity, in the following discussion the term client 102 will be used to refer to all clients 102, regardless of whether a given client 102 is a task owner client 110 or not.

At 508, each given client 102 (e.g., the jth client) identifies a set of one or more neighbor client(s) 102, denoted as $N_j^{out}$, to which the given client 102 will transmit its respective set of local model parameters $w_j$ and its respective weighting coefficient $\alpha_j$. In some examples, step 508 is performed for each round of training, and the neighbor client(s) 102 identified at step 508 may not be the same for each round of training. In other examples, step 508 may not be performed for each round of training (e.g., may be performed only for the first round of training, or may be performed only once every defined number of training rounds), and the given client 102 may use the set of identified neighbor client(s) 102 that was identified in an earlier training round.

It should be noted that each client 102 may be responsible only for identifying the neighbor client(s) 102 for transmitting information (i.e., the set of local model parameters $w_j$ and weighting coefficient $\alpha_j$), and may not be responsible for identifying the neighbor client(s) 102 from which information (i.e., the set(s) of local model parameters and weighting coefficient(s) received from respective neighbor client(s) 102) is(are) received. Further, the set of neighbor client(s) 102 to which information (i.e., the transmitted set of local model parameters and weighting coefficient) is transmitted may be different from the set of neighbor clients(s) 102 from which information (i.e., the set(s) of local model parameters and weighting coefficient(s) received from respective neighbor client(s) 102) is received. For example, in a one-way ring topology, each client 102 may identify a downstream neighbor client 102 to transmit information (i.e., the transmitted set of local model parameters and weighting coefficient) and may receive information (i.e., the set of local model parameters and weighting coefficient received) from a different upstream neighbor client 102.

Various techniques may be used at a given client 102 to identify the neighbor clients(s) for transmitting information. In a simple implementation, all clients 102 may transmit information (i.e., respective set of local model parameters and weighting coefficient) to all other clients 102 (e.g., using collective communication primitives such as AllReduce). However, such an approach may consume significant bandwidth of the communication links between clients 102, and may not be suitable for applications where bandwidth of communication links between clients 102 is limited (e.g., where clients 102 are end user devices). Another possible implementation is for all clients 102 to be connected in a ring topology (e.g., a one-way ring or a two-way ring topology), in which case the number of transmissions is in proportion to the number of clients 102, which may help to reduce the communication overhead and help to achieve higher throughput of information between clients 102.

Other techniques for identifying the neighbor clients(s) of a given client 102 may be used. The technique to be used for identifying the set of neighbor clients(s) may be defined as part of the definition of the local model 104 related to the task by the task owner client 110, in some examples. For example, the set of neighbor clients (s) 102 identified by the jth client 102 may be:

$$N_j^{out} = \{(j-1) \bmod N, (j+1) \bmod N\}$$

The set of identified neighbor client(s) 102 may be time-varying or stochastic, for example:

$$N_j^{out} = \{(j-1+t) \bmod N, (j+1+t) \bmod N\}$$

where t is the number of the training round. Thus, the identified neighbor client(s) 102 may change for each round of training. There may be other criteria for each client 102 to identify a set of neighbor client(s) 102, such as the quality of the direct connection to a neighbor client 102, whether there is a trusted relationship, etc.

It should be understood that by each client 102 identifying its immediate neighbor client(s) 102, each client 102 is responsible for defining its local topology, and in this way the overall topology of the federated learning system 100 is defined in a decentralized manner. Generally, any suitable technique may be used to enable each client 102 to identify a set of neighbor client(s) 102, and thus to define the overall topology for at least one round of training.

At 510, each given client 102 transmits its respective set of local model parameters and its respective weighting coefficient to each neighbor client 102 identified at step 508 (e.g., via the respective agents 108). For the jth client 102, the information ($w_j$, $\alpha_j$) is transmitted to each other client 102 identified in the set $N_j^{out}$.

At 512, each given client 102 receives a set of local model parameters and a weighting coefficient from at least one neighbor (e.g., via the respective agents 108). As noted previously, the neighbor client(s) 102 from which information (i.e., respective set(s) of local model parameters and weighting coefficient(s)) is received at 512 may be different from the neighbor client(s) to which information (i.e., the transmitted set of local model parameters and weighting coefficient received) is transmitted at 510. For the jth client 102, the information ($w_i$,$\alpha_i$) is received from each other client 102 belonging to the set $N_j^{in}$. The set $N_j^{in}$ may not be explicitly defined, but may instead be implied based on which neighbor client(s) 102 sends information to the jth client 102.

It should be noted that steps 510 and 512 may be performed in any order, any may be performed concurrently (e.g., implemented by a client 102 using two separate process or threads of execution for transmitting and receiving).

At 514, each given client 102 aggregates the set(s) of local model parameters received at 512. For example, the set(s) of local model parameters may be aggregated by computing a weighted sum or weighted average. For example, for the jth client 102, a weighted sum (denoted as $\tilde{w}_j$) may be computed as:

$$\tilde{w}_j = \frac{\sum_{i \in N_j^{in}} \alpha_i w_i}{|N_j^{in}|}$$

Similarly, an aggregation of the weighting coefficients received at 512 is computed. For example, for the jth client 102, an aggregated and normalized weighting coefficient (denoted as $\tilde{\alpha}_j$) may be computed as:

$$\tilde{\alpha}_j = \frac{\sum_{i \in N_j^{in}} \alpha_i}{|N_j^{in}|}$$

Other aggregation techniques may be used.

The given client 102 updates its respective set of local model parameters and its respective weighting coefficient using the computed aggregations. For example, for the jth client 102, the set of local model parameters is updated by: $w_j \leftarrow \tilde{w}_j / \tilde{\alpha}_j$ (where the symbol $\leftarrow$ indicates an updating procedure, such as adding the aggregation to the existing set of local model parameters), and the weighting coefficient is updated by: $\alpha_j = \tilde{\alpha}_j$.

At 516, each given client 102 trains its respective local model 104 using its respective local dataset 106. Each given client 102 uses a machine learning algorithm (e.g., as defined by the task owner client 110 during initialization) to update to its respective set of local model parameters. For example, for the jth client 102, the data contained in the local dataset $D_j$ may first be divided into minibatches, each of which is denoted as $\xi_j$. For each minibatch $\xi_j$, a gradient vector, denoted $$\frac{\partial L}{\partial w_j},$$

is computed based on $\xi_j$, where L denotes the loss function. The set of local model parameters $w_j$ is then updated based on the gradient vector $$\frac{\partial L}{\partial w_j}.$$

The computation of gradient vector and the update to the local model parameters is repeated for all minibatches $\xi_j$. In another example, instead of dividing the local dataset $D_j$ into minibatches of data $\xi_j$ and training the local model 104 based on all minibatches, the training may be performed using only one minibatch. In another example, a set of data randomly sampled from the local dataset $D_j$ may be used to train the local model 104. In yet another example, entire local dataset $D_j$ (i.e. all data contained in the local dataset $D_j$) may be used in a single training step. It should be noted that the training the local model 104 by each given client 102 may be performed independently and asynchronously with other clients 102.

At 518, a determination is made whether a predefined convergence condition (e.g., any suitable convergence condition as discussed previously) has been satisfied. The determination whether the convergence condition is satisfied may be performed by the task owner client 110, or may be performed by individual clients 102. If the convergence condition is not satisfied, the method 500 returns to step 508 to perform another round of training. If the convergence condition is satisfied, the method 500 proceeds to step 520.

The convergence condition may be defined by the task owner client 110, as part of defining the local model related to the task T at step 502. For example, the convergence condition may include one or more of: that the number of training rounds meets or exceeds a defined maximum number, that the change in the loss function between the current training round and the immediately previous training round is smaller than a defined threshold, or that 2-norm of the gradient vector is smaller than a defined threshold for at least a defined number of clients 102, among other possible convergence conditions.

Typically, the determination of convergence is performed by the task owner client 110. After determining that the convergence condition is satisfied, the task owner client 110 may notify each other client 102 that the training of the local model 104 related to the task T has ended.

If the determination of convergence is made by individual clients 102, it is possible that some clients 102 determine that the convergence condition is satisfied and other clients 102 determine that the convergence condition is not satisfied (e.g., different clients 102 may have different gradient vectors that may or may not satisfy a convergence condition). In such cases, clients 102 that determine the convergence condition is satisfied may simply cease to participate in further training rounds, and the method 500 returns to step 508 with a reduced number of clients 102 (e.g., until the number of participating clients 102 drops below a defined minimum number).

At 520, after satisfying the convergence condition, each client 102 stores the respective trained local model 104 that includes the respective set of learned local model parameters. The trained local model 104 may then be deployed by each client 102 independently for prediction in an inference phase.

In the example decentralized federated learning system and method described above, some drawbacks of DDML systems, such as DDML system 20, and SPFL systems may be mitigated. For example, privacy of data is maintained by each client because there is no sharing of data contained in the local dataset of each client. Each client trains a respective local model using its local dataset, enabling a diversity of local models to be learned based on non-IID local datasets. Because each client communicates directly with its direct neighbor clients and is responsible for its own aggregation and updating operations, there is a more balanced workload in the decentralized federated learning system, each client has greater control over use of its own resources, and communication latencies between clients participating in training the local models may be lower. The decentralized nature of the disclosed decentralized federating learning system means that failure of any one client does not necessarily result in failure of the entire decentralized federating learning system, each client can operate independently and can identify its own local topology (e.g., to bypass a failed client).

Figure 6:
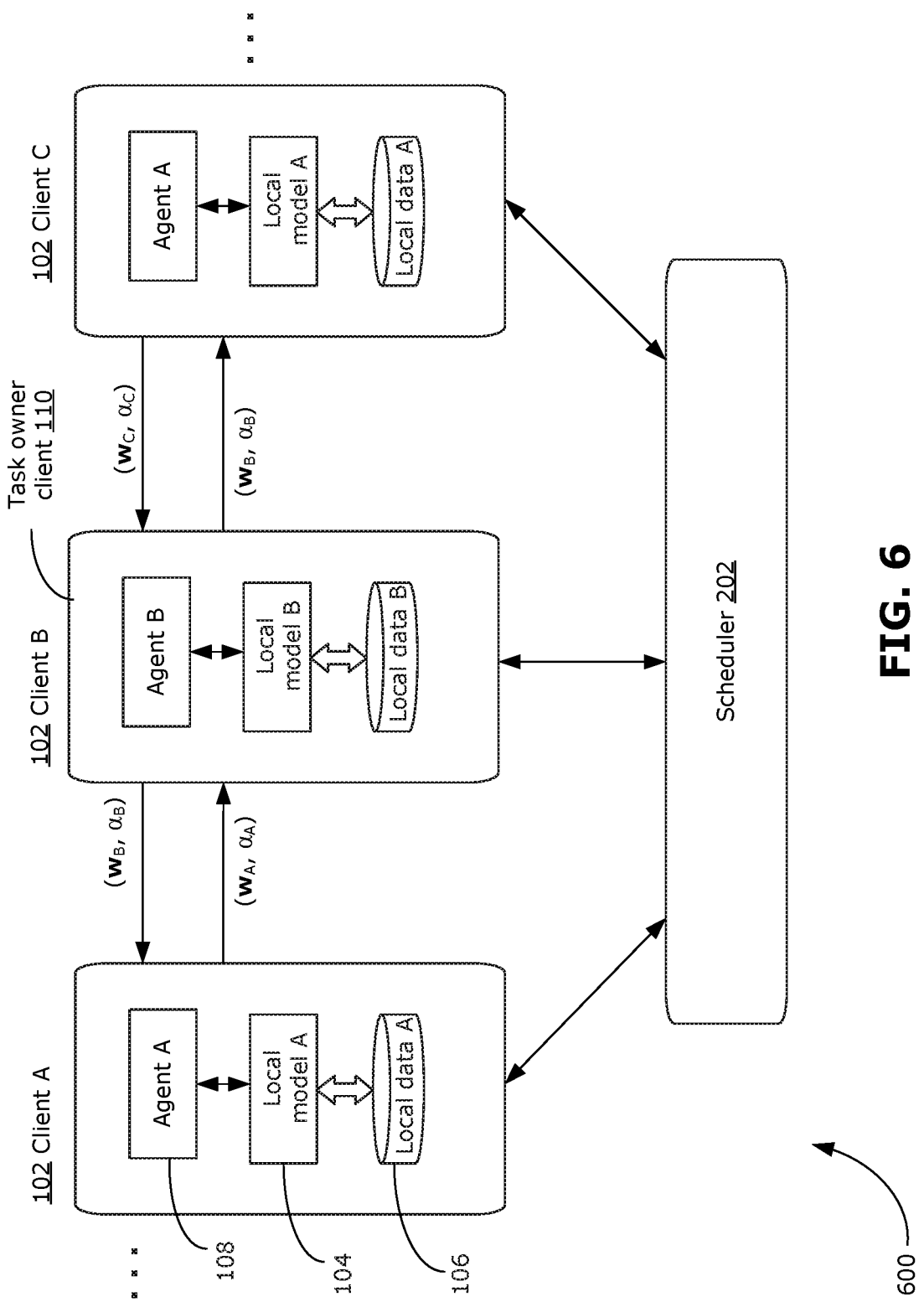
FIG. 6 is a block diagram illustrating another example implementation of a decentralized federated learning system, in accordance with the present disclosure.

FIG. 6 is a block diagram illustrating another example decentralized federated learning system 600 (hereinafter referred to as system 600) that may be used to implement examples of decentralized federated learning, as discussed herein. The system 600 is similar to the system 100 of FIG. 3, with the addition of a scheduler 202. Where the system 600 of FIG. 6 shares components with the system 100 of FIG. 3, similar reference characters have been used and will not be described again in detail.

The scheduler 202 may reside in a trusted third-party node (e.g., a server or private cloud computing platform) that is able to communicate (e.g., via broadcast or via direct connections) with each client 102 in the system 600. For example, the scheduler 202 may reside in a governmental heath unit that is in charge of multiple hospitals of a region (where each hospital is a client 102). In another example, the scheduler 202 may reside in a central datacenter. In some examples, the scheduler 202 may reside in one client 102 (e.g., as a container within a client 102), for example in a client 102 (e.g., the task owner client 110) that has sufficient communication resources to be able to communicate with each other client 102. In some examples, the scheduler 202 may be implemented on a virtual machine provided by a cloud service provider or a private cloud computing platform. The scheduler 202 is a software module (e.g., implemented by a processing device executing instructions stored in memory) that performs operations to initialize the training of the local models related to the task across all clients 102, to monitor and manage the topology, to support management of multiple concurrent training of the local models related to the task, and/or to manage resource allocation, among other operations.

The scheduler 202 supervises and manages the training phase, and may not be used during the inference phase. The scheduler 202 does not receive or send out any data of the clients 102 or model parameters of the local models. The scheduler 202 sends out control signals (e.g., related to task initialization (including definition of the local model architecture and model parameters), neighbor selection, etc.) as will be discussed further below.

The role of the scheduler 202 may help to simplify the operation of individual clients 102 in the system 600, and help to simplify the task initialization tasks that need to be performed by the task owner client 110. For example, the task owner client 110 may only need to request the task initialization, and the scheduler 202 may carry out the details of task initialization. The scheduler 202 may also provide system-wide management, which may enable better optimization of task scheduling and/or resource allocation. For example, the scheduler 202 may manage scheduling of data communication among clients 102 to avoid bottlenecks in the communication resources or congestion in the system 600. The scheduler 202 may also help to ensure fairness among clients 102, for example by ensuring that all participating clients 102 are connected to equal (or approximately equal) numbers of neighbor clients 102. In examples where there may be multiple training tasks being performed concurrently in the system 600, the scheduler 202 may manage scheduling and resource allocation to help ensure the concurrent tasks are managed fairly. The scheduler 202 may also help to define neighbor client(s) for each client 102. The scheduler 202 may help to ensure that all clients 102 are connected to the topology for each training round, and may help to avoid bottlenecks or imbalances in the topology.

It should be noted that a centralized scheduler 202 can be implemented in various ways without sacrificing the benefits of decentralization. The scheduler 202 mainly helps to manage the initialization of the training phase. It should be noted that the scheduler 202 is not equivalent to the role of the central node in SPFL, because the scheduler 202 has little or no role during the training rounds. Accordingly, the use of the scheduler 202 is not expected to add significant number of extra communications during the training phase.

Figure 7:
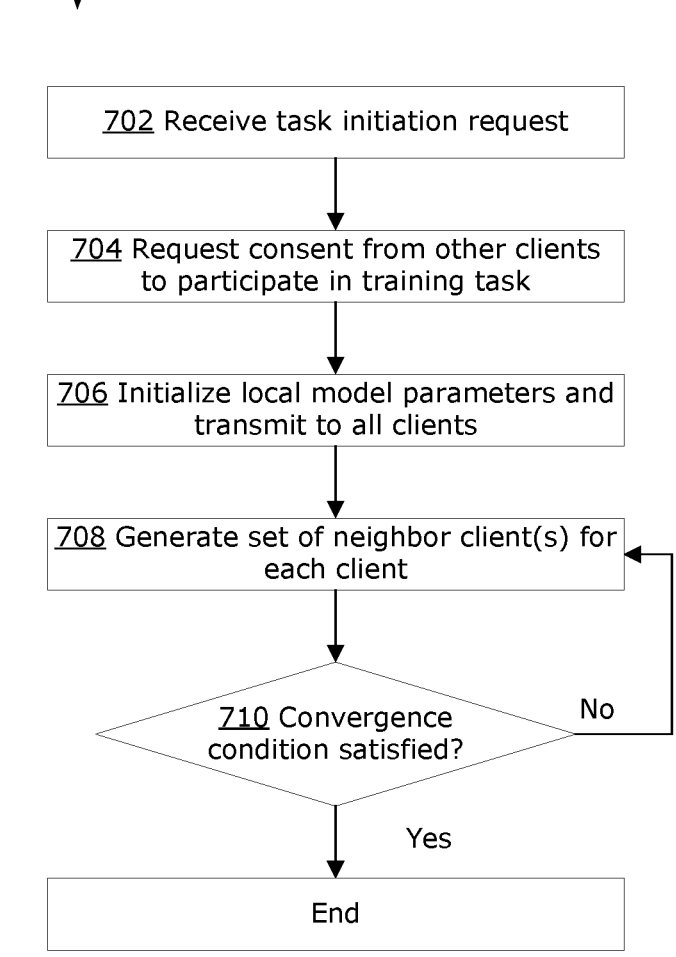
FIG. 7 is a flowchart of an example method that may be implemented by a scheduler in the system of FIG. 6, in according with the present disclosure.

FIG. 7 is a flowchart illustrating an example method 700 that may be performed by the scheduler 202, during training of the local models related to the task (referred to as a training phase). The method 700 may be performed by the scheduler 202 together with a variation of the method 500 performed at each client 102, as discussed further below.

The training phase begins with initialization. Initialization in this example involves both the task owner client 110 and the scheduler 202.

Similar to step 502 of the method 500, the task owner client 110 defines the local model related to the task (which may be denoted as T). Defining the local model related to task includes defining the model architecture, the set of parameters for the model, and a loss function used for training the local model.

Instead of transmitting the task initiation request to other clients 102 directly (as in step 504), the task owner client 110 instead transmits the task initiation request to the scheduler 202.

At 702, the scheduler 202 receives the task initiation request from the task owner client 110. The task initiation request may include the definition of the local model related to the task, for example including a definition of the model architecture, the set of parameters for the local model, and a loss function for training the local model. The scheduler 202 may validate the received request (e.g., to check whether the definition of the local model related to the task provided by the task owner client 110 is valid, or to check whether the task owner client 110 is authorized to initiate training of local models related to the task).

At 704, the scheduler 202 transmits (e.g., broadcasts) a request to one or more other clients 102 to request consent to participate in the training local models related to the task. In some examples, the scheduler 202 may have information about the resources available at each client 102 and/or information about the type or class of data contained in the local dataset at each client 102, and the scheduler 202 may transmit the request for consent only to those clients 102 that the scheduler 202 determines to have sufficient resources and/or suitable data contained in their local datasets to participate in the training local models related to the task.

Each client 102 may independently respond to the request to consent with a positive or negative response (in some examples, no response may be considered to be a negative response). The scheduler 202 may maintain a list of clients 102 that have provided a positive response (e.g., an affirmative consent to participate in the training of local models related to the task). After a sufficient number (e.g., equal to or more than a defined minimum number) of clients 102 provide a positive response to the request, the method 700 proceeds to step 706.

A definition of the local model related to the task (e.g., including a definition of the architecture of the local model, the set of parameters of the local model, and a loss function for training the local model) may be included in the request transmitted at 704. Alternatively, a definition of the local model related to the task may be transmitted after a sufficient number of client(s) 102 have consented to participate in the training of the local models related to the task, and may be transmitted only to the client(s) 102 that have provided consent to participate in the training of local models related to the task.

At 706, the scheduler 202 initializes the set of model parameters of the local models to an initial set of model parameters (e.g., by setting the value of each parameter to a respective random value) and transmits the initial set of model parameters to all clients 102 participant in the training of the local model (including the task owner client 110).

Each given client 102 initializes its respective set of local model parameters $w_j$ (i.e. the parameters of its respective local model related to the task) and weighting coefficient $\alpha_j$. This may be similar to step 506 of the method 500, however the set of initial model parameters is received by all client clients 102 (including the task owner client 110) from the scheduler 202.

At 708, the scheduler 202 generates the set of neighbor clients(s) for each client 102 and provides the identified set of neighbor clients(s) to each respective client 102. For example, the scheduler 202 generates the set of neighbor clients(s) $N_j^{out}$ for the jth client 102, where the generated set of neighbor client(s) indicates the neighbor client(s) to which the jth client 102 is to transmit its respective set of local model parameters $w_j$ (i.e. the set of parameters of its local model related to the task) and its respective weighting coefficient $\alpha_j$ in a training round. In some examples, the scheduler 202 may also generate the set of neighbor client(s) $N_j^{in}$ to indicate the neighbor client(s) from which the jth client 102 is to receive respective set(s) of local model parameters (e.g. sets of parameters of the local models related to the task) and weighting coefficient(s) in a training round. In other examples, the set of neighbor clients (s) $N_j^{in}$ may not be explicitly defined by the scheduler 202.

In some examples, step 708 is performed for each round of training, and the sets of neighbor clients(s) generated for each client 102 may not be the same for each round of training. In other examples, step 708 may not be performed for each round of training (e.g., may be performed only for the first round of training, or may be performed only once every defined number of training rounds), and each client 102 may use the set of identified neighbor clients(s) that was provided by the scheduler 202 in an earlier training round.

The scheduler 202 may generate the set of neighbor client(s) for each client 102 based on criteria that may be defined to: achieve a more balanced workload among clients 102, avoid a bottleneck, achieve a more balanced traffic flow among clients 102, optimize resource allocation among clients 102, avoid traffic congestion, and/or reroute around a failed client 102, among other possibilities. The scheduler 202 may use any suitable traffic management and resource optimization techniques to generate the set of neighbor clients(s) for each client 102. For example, each client 102 may (e.g., periodically such as after each round of training or in response to a request from the scheduler 202) report to the scheduler 202 its respective status such as resource usage (e.g., memory usage), utilization of bandwidth of the communication link connecting the clients 102 and/or progress in training (e.g., number of training rounds conducted, or change in loss function between training rounds), among others. The scheduler 202 may use this information as input to an optimization algorithm, to manage data traffic, resource usage, execution time, etc.

At each given client 102, step 508 of method 500 may be modified such that the set of neighbor clients(s) is identified using the set of neighbor clients (s) provided by the scheduler 202 (instead of each client 102 performing its own discovery of neighbor clients(s)).

Each given client 102 then performs steps 510-516 as discussed above to carry out one round of training.

The determination of whether the convergence condition is satisfied may be performed by the task owner client 110 and/or by each individual client 102, similar to step 518 described above.

Additionally or alternatively, the scheduler 202 may, at 710, determine whether the convergence condition is satisfied. For example, the scheduler 202 may determine that the number of training rounds (e.g., as reported by individual clients 102) meets or exceeds a defined maximum number (e.g., a maximum number defined as part of the task definition). If individual clients 102 also make a determination whether the convergence condition is satisfied and drop out of training when convergence has been individually determined, the scheduler 202 may determine that the training phase should end after a threshold number of clients 102 have individually dropped out of training.

If the convergence condition is not satisfied, the method 700 returns to step 708 to perform another round of training. If the convergence condition is satisfied, the scheduler 202 may notify all participating clients 102 to end training, and the method 700 ends.

The example decentralized federated learning system and method described above, including the use of a scheduler, may provide better monitoring and management of the overall topology of the clients in the decentralized federated learning system and of concurrent training of multiple different local models related to different tasks, compared to examples that do not include a scheduler. The implementation of a scheduler may require a central trusted entity having communication links with each client 102 directly.

Another example of the disclosed decentralized federated learning system and method is now described, which may be implemented without a scheduler (e.g., using the system 100 of FIG. 3) or with a scheduler (e.g., using the system 600 of FIG. 6). In this example, the overall topology of the decentralized federated learning system used for connecting all clients 102 is a one-way ring or a Hamiltonian cycle.

The initialization of the training of local models related to a task, the local model parameters and the weighting coefficients may be similar to that described previously (with or without the involvement of the scheduler 202).

When identifying the set of neighbor client(s) 102 for each client 102, each client 102 identifies only one direct neighbor client 102 (e.g., select a direct neighbor client at random from its direct connections) to which the weighting coefficient and the set of local model parameters is sent. The resulting overall topology of the decentralized federated learning system is a one-way ring (or a Hamiltonian cycle), in which each given client 102 transmits the weighting coefficient and the set of local model parameters to only one direct neighbor client 102, and receives a weighting coefficient and a set of local model parameters from only one other direct neighbor. The scheduler 202, if used, may help to ensure that all clients 102 are connected in a one-way ring. Any suitable technique may be used to ensure that the clients 102 are connected in a Hamiltonian cycle.

Because each client 102 receives information (i.e., the set of local model parameters and the weighting coefficient) from only one neighbor client 102, the aggregation step may be simplified. For example, consider the jth client 102 that receives, from the ith client 102, the set of local model parameters and the weighting coefficient $(w_i, \alpha_i)$. The jth client 102 may then compute the aggregation as follows:

$$\tilde{w}_j = \beta_j w_j + (1-\beta_j) w_i$$

$$\tilde{\alpha}_j = \beta_j \alpha_j + (1-\beta_j) \alpha_i$$

where $\beta_j$ is a discount factor controlling the influence of the information from the ith client 102. The discount factor $\beta_j$ is a continuous value between 0 and 1, and may represent the importance of the ith client 102 relative to the jth client 102. For example, if there is an established, trusted relationship between the jth client 102 and the ith client 102, the discount factor $\beta_j$ may be relatively low (e.g., less than 0.5). In another example, if the local dataset 106 at the the ith client 102 has a distribution that is similar to that of the local dataset 106 at the jth client 102, the discount factor $\beta_j$ may be relatively low. The discount factor $\beta_j$ may be defined by the jth client 102, based on known characteristics of the ith client 102, for example. In examples where a scheduler 202 is used, the scheduler 202 may global information about the relative trustworthiness of different clients 102 and may provide the discount factors for different clients 102 accordingly. The set of local model parameters (i.e. the sets of parameters of the local models related to the task) and the weighting coefficient may then be updated using the computed aggregation, as discussed previously, for example by setting: $w_j \leftarrow \tilde{w}_j / \tilde{\alpha}_j$ and $\alpha_j = \tilde{\alpha}_j$.

This example may be simpler to implement by individual clients 102, because in each round of training, each client 102 only transmits information to one neighbor client 102. In a decentralized federated learning system having n participating clients 102, there are exactly n transmissions of information per training round, which may be less demanding on the communication resources of the communication network used by the clients 102. When performing aggregation, each client 102 performs a relatively simple linear combination as detailed above. This example is based on the clients 102 being connectable by a Hamiltonian cycle (in which every client 102 of a topology is traversed exactly once, starting and ending at the same client 102), and may be suitable when clients 102 are all fully connected.

In various examples, the present disclosure describes methods and systems for decentralized federated learning. The disclosed examples enable privacy of data at a client to be maintained during decentralized federated learning of a local model related to a task, because data from local datasets do not need to be shared outside of the client. The disclosed examples enable machine learning using unbalanced and heterogeneous data distribution across different clients (e.g., non-IID datasets), and enable each client to learn a respective local model that is optimized based on its respective local dataset. Because clients communicate mainly directly with each other during training, there may be lower communication latency and less data network traffic compared to other existing techniques, which may lead to faster response time and shorter request queues. The decentralized nature of the disclosed methods and systems for federated learning provide greater robustness, because the disclosed decentralized federated learning system is not susceptible to abrupt failure if one client fails, nor is the decentralized federated learning system dependent on the availability of a single central node. The disclosed examples may also provide individual clients with greater autonomy to control use of their own resources.

The examples disclosed herein may be applicable to a number of different fields where AI can be used. For example, in the medical and health industry, examples disclosed herein may enable multiple hospitals to collaboratively train AI models to perform a variety of tasks, such as diagnosis, pathological analysis, etc., without risking loss of privacy to patients, and without having to negotiate the logistics of setting up and maintaining a central health authority.

In the transportation industry, examples disclosed herein may be useful for implementation of semi-autonomous and fully-autonomous vehicles. For example, semi-autonomous and fully-autonomous vehicles may be equipped for vehicle-to-vehicle (V2V) communication, and may collaboratively learn a model related to a driving task.

The examples disclosed herein may be used for learning various machine learning models using any supervised learning algorithm, for example, logistic regression, support vector machines (SVMs), decision trees, and other neural network architectures.

The examples disclosed herein may be implemented using any suitable communication protocol, including communication technologies that support asynchronous communication and random neighbor selection.

Although some examples have been described in the context of a single training task, it should be understood that the disclosed example methods and systems may support multi-tenancy task scheduling, to enable multiple federated learning tasks to be running concurrently in the same system.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute example embodiments of the methods disclosed herein. The machine-executable instructions may be in the form of code sequences, configuration information, or other data, which, when executed, cause a machine (e.g., a processor or other processing device) to perform steps in a method according to example embodiments of the present disclosure.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A client computing system of a decentralized federated learning system, the client computing system comprising:
   a memory storing a first set of local model parameters for a local machine learning model, and storing a first weighting coefficient representing a relative importance of a local dataset; and a processing device in communication with the memory, the processing device configured to execute instructions to cause the client computing system to:
   perform iterations of training for training the local machine learning model to perform a defined task, wherein performing a given iteration of training comprises:
   identifying, using a formula indicated in a definition of the local machine learning model to perform the defined task, a set of one or more neighbor client computing systems of the decentralized federated learning system in direct communication with the client computing system, the set of one or more neighbor client computing systems being identified by the client computing system in absence of instructions from a task owner computing system in the decentralized federated learning system, wherein the formula uses a number of the given iteration of training as a parameter in the formula to define the set of one or more neighbor client computing systems such that the set of one or more neighbor client computing systems identified in the given iteration of training is different from an immediately prior set of one or more neighbor client computing systems identified in an immediately prior iteration of training, wherein the set of one or more neighbor client computing systems identified in the given iteration of training using the formula is fewer than all neighbor client computing systems in direct communication with the client computing system;
   transmitting the first weighting coefficient and the first set of local model parameters only to each identified neighbor client computing system in the set of one or more neighbor client computing systems;
   receiving, from one or more other neighbor client computing systems based on identification of the client computing system as a neighbor recipient using the formula at the one or more other neighbor client computing systems, a respective second set of local model parameters and a respective second weighting coefficient, the one or more other neighbor client computing systems being different or same as the identified one or more neighbor client computing systems;
   updating the first set of local model parameters using a weighted aggregation of the respective second set of local model parameters received from the one or more other neighbor client computing systems, each respective second set of local model parameters being weighted with the respective second weighting coefficient; and
   training the local machine learning model using a machine learning algorithm and the local dataset; and
   end the given iteration of training when a predefined convergence condition is satisfied, and when the predefined convergence condition is not satisfied, perform a subsequent iteration of training.

2. The client computing system of claim 1, wherein the processing device is configured to execute instructions to cause the client computing system to, in the given iteration of training:
   update the first weighting coefficient using a normalized aggregation of the respective second weighting coefficient received from the one or more other neighbor client computing systems.

3. The client computing system of claim 1, wherein the processing device is configured to execute instructions to cause the client computing system to initialize the iterations of training by, prior to a first iteration of training:

defining the task to be learned by the local machine learning model, the definition further including a model architecture and a set of parameters to be used for the local machine learning model, the definition also including a loss function to be used for training the local machine learning model; and transmitting a task initialization request to one or more other client computing systems of the decentralized federated learning system.

4. The client computing system of claim 3, wherein the task initialization request is transmitted to a scheduler, and wherein the task initialization request causes the scheduler to transmit a participation request to each of one or more other client computing systems of the decentralized federated learning system.

5. The client computing system of claim 1, wherein the processing device is configured to execute instructions to cause the client computing system to, prior to a first iteration of training:

initialize each local model parameter of the first set of local model parameters to an initial model parameter value; and initialize the first weighting coefficient to an initial weighting coefficient value.

6. The client computing system of claim 5, wherein the set of initial model parameter values is received from another client computing system of the decentralized federated learning system.

7. The client computing system of claim 5, wherein the initial weighting coefficient value is based on a size of the local dataset.

8. The client computing system of claim 1, wherein the processing device is configured to execute instructions to cause the client computing system to, in the given iteration of training:

identify only one neighbor client computing system in direct communication with the client computing system, the identified one neighbor client computing system being fewer than all neighbor client computing systems in direct communication with the client computing system;

transmit the first weighting coefficient and the first set of local model parameters to only the one identified neighbor client computing system; and receive, the second set of local model parameters and the second weighting coefficient from only one other neighbor client computing system that is different from the one identified neighbor client computing system;

wherein the weighted aggregation used to update the first set of local model parameters is a linear combination of the first set of local model parameters and the second set of local model parameters.

9. The client computing system of claim 1, wherein, in the given iteration of training, training the local machine learning model comprises:

computing a gradient vector, using at least some data of the local dataset and a loss function; and updating the first set of local model parameters using the gradient vector.

10. A computing system of a decentralized federated learning system, the computing system comprising:

a memory storing a first set of local model parameters for a local machine learning model, and storing a first weighting coefficient representing a relative importance of a local dataset; and a processing device in communication with the memory, the processing device configured to execute instructions to cause the computing system to cause a plurality of client computing systems to perform iterations of training of a local machine learning model by:

receiving a task initiation request, the task initiation request defining a task to be learned by the local machine learning model at each of the plurality of client computing systems of the decentralized federated learning system;

initializing a set of initial model parameter values for a set of local model parameters to be used by the local machine learning model, and transmit the set of initial model parameters to each of the plurality of client computing systems;

wherein, in each iteration of training, each of the plurality of client computing systems identifies, using a formula indicated in a definition of the local machine learning model to perform the defined task, a respective set of one or more neighbor client computing systems for exchanging information during training to learn the local machine learning model in absence of instructions from a task owner computing system, wherein the formula uses a number of a given iteration of training as a parameter in the formula to define a given set of one or more neighbor client computing systems for a given client computing system such that the given set of one or more neighbor client computing systems identified by the given client computing system in the given iteration of training is different from an immediately prior set of one or more neighbor client computing systems identified by the given client computing system in an immediately prior iteration of training, wherein the set of one or more neighbor client computing systems identified in the given iteration of training using the formula is fewer than all neighbor client computing systems in direct communication with the client computing system, wherein each client computing system transmits a respective first weighting coefficient and a respective first set of local model parameters only to the given set of one or more neighbor client computing systems, wherein each client computing system receives from one or more other neighbor client computing systems based on identification of the client computing system as a neighbor recipient using the formula at the one or more other neighbor client computing systems, a respective second set of local model parameters and a respective second weighting coefficient, the one or more other neighbor client computing systems being different or same as the given set of one or more neighbor client computing systems, each client computing system updates the respective first set of local model parameters using a weighted aggregation of the respective second set of local model parameters received from the one or more other neighbor client computing systems, each respective second set of local model parameters being weighted with the respective second weighting coefficient, and each client computing system trains a respective local machine learning model using a machine learning algorithm and a respective local dataset;

determining whether a predefined convergence condition is satisfied; and transmitting a notification to each of the plurality of client computing systems to end the given iteration of training when the predefined convergence condition is satisfied, and when the predefined convergence condition is not satisfied, causing the plurality of client computing systems to perform a subsequent iteration of training.

11. The computing system of claim 10, wherein the processing device is configured to execute instructions to cause the computing system to:

receive, from each of the plurality of client computing systems, consent to participate in training to learn the task;

wherein the set of initial model parameters is transmitted to each respective client computing system after receiving consent from the respective client computing system.

12. The computing system of claim 10, wherein the definition included in the task initiation request further includes a model architecture and a set of parameters to be used for the local machine learning model, the definition also including a loss function to be used for training the local machine learning model; and wherein the processing device is configured to execute instructions to cause the computing system to:

transmit the definition to each of the plurality of client computing systems.

13. The computing system of claim 10, wherein the computing system is one of the plurality of client computing systems.

14. A method, at a client computing system of a decentralized federated learning system, the method comprising:

performing iterations of training for training a local machine learning model to perform a defined task, wherein performing a given iteration of training comprises:

identifying, using a formula indicated in a definition of the local machine learning model to perform the defined task, a set of one or more neighbor client computing systems of the decentralized federated learning system in direct communication with the client computing system, the set of one or more neighbor client computing systems being identified by the client computing system in absence of instructions from a task owner computing system in the decentralized federated learning system, wherein the formula uses a number of the given iteration of training as a parameter in the formula to define the set of one or more neighbor client computing systems such that the set of one or more neighbor client computing systems identified in the given iteration of training is different from an immediately prior set of one or more neighbor client computing systems identified in an immediately prior iteration of training, wherein the set of one or more neighbor client computing systems identified in the given iteration of training using the formula is fewer than all neighbor client computing systems in direct communication with the client computing system;

transmitting a first weighting coefficient and a first set of local model parameters only to each identified neighbor client computing system in the set of one or more neighbor client computing systems, the first weighting coefficient representing a relative importance of a local dataset, the first set of local model parameters being parameters for the local machine learning model;

receiving, from one or more other neighbor client computing systems based on identification of the client computing system as a neighbor recipient using the formula at the one or more other neighbor client computing systems, a respective second set of local model parameters and a respective second weighting coefficient, the one or more other neighbor client computing systems being different or same as the identified one or more neighbor client computing systems;

updating the first set of local model parameters using a weighted aggregation of the respective second set of local model parameters received from the one or more other neighbor client computing systems, each respective second set of local model parameters being weighted with the respective second weighting coefficient; and training the local machine learning model using a machine learning algorithm and the local dataset; and ending the given iteration of training when a predefined convergence condition is satisfied, and when the predefined convergence condition is not satisfied, perform a subsequent iteration of training.

15. The method of claim 14, further comprising initializing the iterations of training by, prior to a first iteration of training:

defining the task to be learned by the local machine learning model, the definition further including a model architecture and a set of parameters to be used for the local machine learning model, the definition also including a loss function to be used for training the local machine learning model; and transmitting a task initialization request to one or more other client computing systems of the decentralized federated learning system.

16. The method of claim 14, further comprising, in the given iteration of training:

identifying only one neighbor client computing system in direct communication with the client computing system, the identified one neighbor client computing system being fewer than all neighbor client computing systems in direct communication with the client computing system;

transmitting the first weighting coefficient and the first set of local model parameters to only the one identified neighbor client computing system; and receiving, the second set of local model parameters and the second weighting coefficient from only one other neighbor client computing system that is different from the one identified neighbor client computing system;

wherein the weighted aggregation used to update the first set of local model parameters is a linear combination of the first set of local model parameters and the second set of local model parameters.

* * * * *